United States Patent [19]

Ernst

[11] 4,426,088

[45] Jan. 17, 1984

[54] CENTRIFUGAL FLUID SEAL WITH DRAIN HOLES AND FLUID DIVERTING MEANS

[76] Inventor: Hermann H. F. Ernst, R.R. 2, St. Cloud, Minn. 56301

[21] Appl. No.: 401,737

[22] Filed: Jul. 26, 1982

[51] Int. Cl.³ .................... F16J 15/42; F16J 15/44
[52] U.S. Cl. ................................ 277/14 R; 277/25; 277/56; 277/135
[58] Field of Search ............... 277/13, 14 R, 14 V, 277/25, 53–57, 135

[56] References Cited

U.S. PATENT DOCUMENTS

| | | | |
|---|---|---|---|
| 1,986,621 | 1/1935 | Bott | 277/82 |
| 2,823,052 | 2/1958 | Collman | 277/13 |
| 2,834,618 | 5/1958 | Wiltse | 277/14 R |
| 2,873,986 | 2/1959 | Murray | 277/13 |
| 2,960,356 | 11/1960 | Tyce et al. | 277/25 |
| 3,214,088 | 10/1965 | Adams | 277/57 X |
| 3,455,561 | 7/1969 | Rinker et al. | 277/13 |
| 3,765,688 | 10/1973 | Junker | 277/14 R |

FOREIGN PATENT DOCUMENTS 2021211 11/1979 United Kingdom ............... 277/53

Primary Examiner—Robert S. Ward, Jr.
Attorney, Agent, or Firm—Hill, Van Santen, Steadman & Simpson

[57] ABSTRACT

A centrifugal fluid seal construction may be employed to provide a pressure seal along a rotating shaft passing through a housing wall, and may also be employed as a containment seal where the pressure drop across the seal is minimal. Each of the disclosed embodiments includes a hollow rotor formed by an annular cup enclosed by an annular cover and adapted to be sealingly mounted on the shaft. Drain holes are present near the outer periphery of the hollow rotor. The housing has structure including an annular cap that defines a cavity in which the rotor is disposed in closely spaced relation to the housing. The housing cap has a cylindrical portion that extends into the rotor through the annular rotor cover and defines therewith an annular gap for fluid that may have leaked to pass radially outwardly under the influence of centrifugal force to the drain holes. Along such path there are conducting means for increasing the surface area in the form of axially spaced annular laminations or unified porous material. On the cylindrical portion of the housing cap that projects into the rotor, there are diverting means which divert fluid from the gap toward the drain holes, such means being in the form of an annular step, annular grooves with sharp crests, or an annular flange, and in each instance, such diverting means does not extend into any liquid volume. With this arrangement only liquid or air separate the moving and stationary parts and a zero-leakage seal capable of high-speed operation at adverse temperatures or sealing fluids may be utilized.

18 Claims, 9 Drawing Figures

CENTRIFUGAL FLUID SEAL WITH DRAIN HOLES AND FLUID DIVERTING MEANS

BACKGROUND OF THE INVENTION

Field of the Invention

This invention relates to a centrifugal fluid seal, and more specifically to one that is capable of accommodating high relative rotational speeds between a shaft and a housing.

Prior Art

All presently known types of shaft seals have small leakages during operation, the leakage rate tending to increase in response to increasing circumferential speeds. In certain applications, these leakage losses are not acceptable. Further, known elastomeric lip seals which involve frictional contact between relatively rotating sealing surfaces and an elastomeric lip, are especially disadvantageous at high speeds and/or over long operational periods. Even with optimum lubrication, wear and heat damage an elastomeric lip and/or the opposing surface in a relatively short time. For example, a life test of a modern elastomeric lip seal has a 50% failure rate in 1200 hours.

SUMMARY OF THE INVENTION

The present invention is directed to a centrifugal fluid seal, preliminary testing of which shows no leakage under test conditions which are somewhat more severe than those used in standard testing. Lubricity of the sealing medium is not required, and while 1700 ft/min is a standard shaft speed for testing, the preliminary tests of the present invention indicate a capability of shaft speeds exceeding 40,000 ft/min with no leakage and practically no wear.

Accordingly, it is an object of the present invention to provide a centrifugal fluid seal which as a practical matter provides zero leakage over a wide range of speeds up to and exceeding 40,000 ft/min of relative movement between a shaft and an adjacent surface.

A further object of the present invention is to provide a centrifugal fluid seal which does not depend on lubrication characteristics of a sealing fluid.

Another object of the present invention is to provide a centrifugal fluid seal which as a practical matter has no seal wear or deterioration, even at high operating speeds and high sealing fluid temperature, thereby providing a long seal life.

Yet another object of the present invention is to provide a centrifugal fluid seal construction which can be readily produced by mass production techniques and which does not require unusual exacting manufacturing tolerances. To this end, considerable shaft run-out and out-of roundness can be tolerated, while shaft surfaces in the area of the seal do not require any special machining or treatment. The mass production techniques referred to include stamping, coining, deep-drawing, and the like.

Many other advantages, features and additional objects of the present invention will become manifest to those versed in the art upon making reference to the detailed description and the accompanying sheets of drawings in which preferred structural embodiments incorporating the principles of the present invention are shown by way of illustrative example.

ON THE DRAWINGS

AS SHOWN ON THE DRAWINGS

Figure 1:
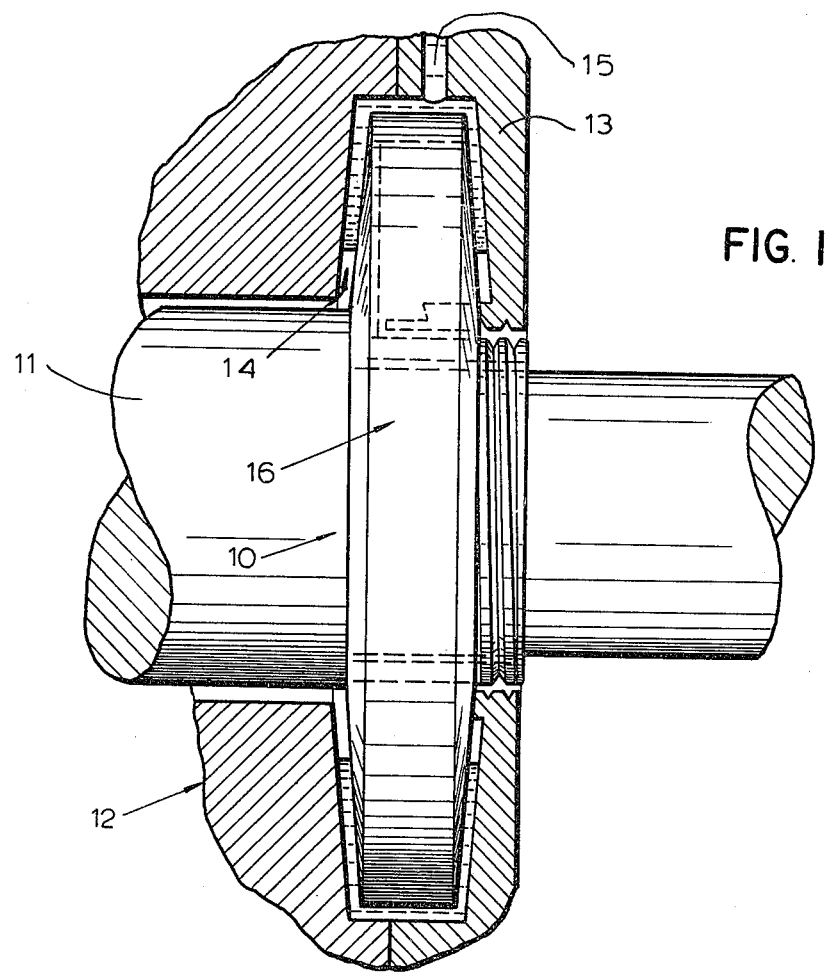
FIG. 1 is an elevational view of a centrifugal fluid seal shown in association with a shaft and a housing and provided according to the principles of the present invention.

The principles of the present invention are particularly useful when embodied in a centrifugal fluid seal 10 shown mounted on a rotating shaft 11 supported by bearings (not shown) in a housing 12, as shown in FIG. 1. In this embodiment, a portion of the housing 12 forms part of the seal 10 as is explained below.

The housing 12 includes a housing cap 13 detachably secured to the main portion of the housing, their interface being fluid-tight. The main part of the housing 12 and the cap 13 jointly define an annular housing cavity 14, there being a fluid port 15 communicating with the cavity 14.

Figure 2:
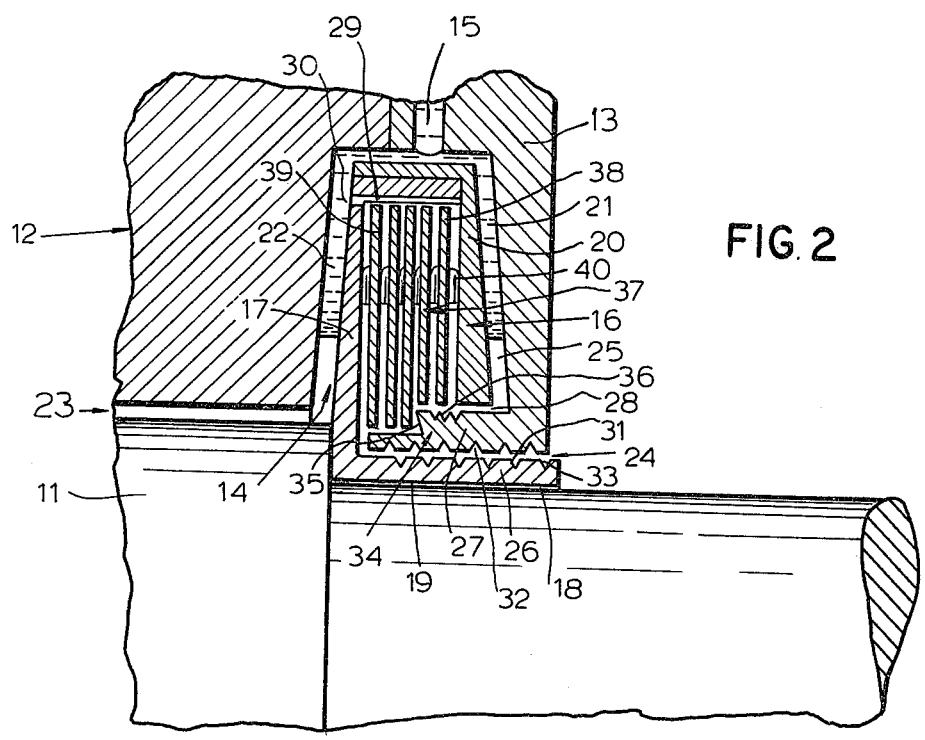
FIG. 2 is an enlarged cross-sectional view taken radially through the seal of FIG. 1.

The centrifugal seal 10 further includes a hollow rotor 16 shown in elevation in FIG. 1 and in cross-section in FIG. 2. The rotor 16 comprises an annular cup 17 having an axial opening 18 through which the shaft 11 extends, there being a fluid-tight relation between the cup 17 and the shaft 11, here ensured by a thin layer of elastomeric material 19 on the surface of the hole 18 in the cup 17. The rotor 16 further includes an annular cover 20 which encloses the periphery of the cup 17. There may be a press fit between the cup 17 and the cover 20. The rotor 16 is thus disposed in the cavity 14 and is surrounded by the housing 12 but is disposed in spaced relation thereto, thus leaving an annular space 21 around the outer portion of the rotor 16. Thus, the housing 12 by virtue of the space 21 is spaced from the rotor 16 and the shaft 11. The space 21 is receptive of a sealing fluid 22 which engages the stationary housing 12 and the rotating rotor 16. When the fluid pressure at 23 and 24, at opposite sides of the rotor 16, is the same, the sealing fluid 22 will have a surface at opposite sides of the rotor 16 disposed the same distance from the rotational axis. However, if the pressure at 23 is greater or less than the pressure at 24, then the sealing fluid 22 will be unequally disposed at opposite sides of the rotor 16. The maximum pressure difference that can be accommodated across the fluid seal 10 will be dependent upon various factors including primarily the relative rotational speed and hence centrifugal force applied to the sealing fluid 22, which increases with the square of the radial distance from the rotational axis.

The majority of the potential leakage will be stopped by the structure thus far described. However, there are some boundary layer effects that must be considered. The sealing fluid 22 which engages the wetted walls of the housing 12, including the cap 13, tends to stand still while the sealing fluid 22 that engages the wetted walls of the rotor 16 tends to rotate at nearly the speed of the rotor 16. In addition, centrifugal force tends to move all the fluid toward the radially outer portion of the space 21. Nevertheless, there is some further fluid particle movements that occur. As a particle of fluid engaging the rotor is thrown radially outwardly, it tends to displace radially inwardly along the stationary wall of the cap 13 a corresponding volume of sealing fluid. The bulk of this circulation takes place within the sealing fluid 22, but some of that fluid can creep due to surface tension radially inwardly along the stationary wall into an air space 25. Again, much of this fluid will be picked up by the adjacent wetted wall of the rotor and returned centrifugally radially outwardly. Thus, if the space 25 opened directly to the atmosphere there would be very little sealing fluid lost, but as the rotational speeds increased, the amount of loss would increase.

The present invention deals primarily with means for preventing the escape of such minor leakage to the atmosphere.

To that end, the rotor 16 is hollow and includes a cylindrical portion 26 having the axial opening 18, and the housing cap 13 has a cylindrical portion 27 which projects through the annular cover 20 into the annular cup 17 into the interior of the rotor 16. With this arrangement, the inner periphery of the cover 20 and the radially outer periphery of the cylindrical portion 27 of the housing cap jointly define an annular gap 28 leading from the space 21 to the interior of the rotor 16. Radially outwardly of the annular gap 28 there is provided in the rotor 16, near the largest diameter of the hollow interior, a series of drain holes 29 that discharge into the space 21 at 30. In this embodiment, the drain holes 29 have been drilled through the peripheral portion of the cup 17, and then a final cut has been taken to provide the final largest diameter of the hollow interior, such cut breaking through the openings 29. Thus, the drain holes 29 are in effect grooves within the rotor but are actual openings at 30.

The cylindrical portion 26 of the cup 17 and the cylindrical portion 27 of the cap 13 jointly define a second annular gap 31 which communicates from outside the cap at 24 to the interior of the rotor 16. A screw thread seal 32 is provided on the cap and a further screw thread seal 33 is provided on the cup 17 in a preferred embodiment. However, the invention will operate without this feature, will operate more reliably with one of the screw thread seals 32,33, but the presence of both seals 32,33 optimizes the construction. Whether the screw thread seals 32,33 are right-handed or left-handed depends in the first instance upon what the direction of rotation of the shaft 11 is to be. However, it can also be dependent upon the user's selection as to whether it is desired to have the same repel any sealing fluid 22 toward the interior of the rotor 16, or whether it is desired to repel fluid entry at 24. With this arrangement, any sealing fluid 22 entering the annular gap at 28 will be in contact with the interior of the rotor and thus be immediately subjected to centrifugal forces directing the same away from the second annular gap 31.

In order to maximize the opportunity of centrifugal force acting on all sealing fluid 22 coming through the first annular gap 28, there are provided diverting means generally indicated at 34, on the housing 12 within the rotor 16 downstream of the annular gap 28 to divert sealing fluid from the gap 28 toward the drain holes 29. In this embodiment, the more important diverting means 34 constitutes an annular step or shoulder 35. Further, there is provided a set of annular grooves 36 adjacent thereto. The effective flow area of the drain holes 29 is at least as large as the effective flow area of the annular gap 28, and therefore, sealing fluid 22 will not accumulate within the rotor to any significant extent, and thus it can be seen that the annular step 35 and the annular grooves 36 are spaced radially inwardly from any liquid collection that might be taking place in connection with the continuous draining of sealing fluid through the drain holes 29.

To some extent, the drawing is necessarily schematic in that various gaps have been enlarged to facilitate illustration. However, the actual clearance at the annular gaps 28 and 31 is somewhat less than that shown. Any leakage along the gap 28 is thus subjected to the high rotational speeds of the radially inner periphery of the rotor cover 20, and any bubbles or drops that might be created are first broken up by the annular grooves 36, and any fluid getting past that diverting means encounters the second diverting means, namely the step 35 which thus inherently has surfaces of a lesser diametral size than that of the gap 28 but larger than the second annular gap 31. To further maximize the transfer of sealing fluid 22 from the annular gap 28 to the drain holes 29, there is provided therebetween and within the rotor 16 a conducting means generally indicated at 37. Whatever conducting means is utilized, it is disposed within the rotor and provides surfaces that rotate with the rotor and thus facilitate the transfer of fluid from the gap 28 to the drain holes 29. In this embodiment, the conducting means 37 comprises two sets of axially spaced annular laminations 38,39. The laminations 38, 39 here have the same outside diameter and are guided at their outer peripheries by the interior cylindrical wall of the annular cup 17. A number of tabs such as 40 have been struck out of each of the laminations, 38,39 to provide axial spacing between the laminations. The inner peripheries of the laminations 38 have a diameter similar to the size of the annular gap 28, while the inner peripheries of the laminations 39 have a diameter which partially overlaps the shoulder portion of the step 35. As the laminations rotate with the rotor 16, it is not intended that any portion of any lamination come in contact with any part of the cylindrical portion 27 of the housing cap 13. If it did, during operation, there would be an immediate wearing away at one of the engaging surfaces whereupon the seal would be "broken in". However, such is a fail-safe feature as it is preferred that there be no contact between any stationary part and any rotating part. Note that it is an impossibility for any stationary part to come into contact with any accumulation of rotating sealing fluid.

Thus, with this arrangement, a sealing fluid is used to maintain a pressure difference between the points 23 and 24, and any sealing fluid that tends to leak out will be caught within the rotor and returned through the drain holes 29 to rejoin other sealing fluid at 30. Thus, the fluid seal 10 maintains the pressure present at 23 without there being any leakage of sealing fluid at 24, even at exceptionally high operating speeds. Since the rotating parts at no point contact the stationary parts, lubrication is not necessary, and thus the sealing fluid can be chosen without regard to its lubricating capability. Even with extremely high operating speeds, and with high sealing fluid temperature, there is no significant wear or deterioration, whereby a long operating life is assured. Further, any energy-weak particles of sealing fluid that break into the annular gap 28 provide a slight leakage as is the case with presently commercially available fluid seal rings. However, any particles passing through the annular gap 28 tending to emerge at 24 where the pressure is lower, are diverted by structure within the rotor to the space 21. The radial step 35 prevents sealing fluid from creeping along the surface. The sharp edged grooves 36 also function to minimize such creepage. The circulation of fluid particles within the hollow rotor is completely different from the circulation present in the space 21, because all the surfaces within and supported by the rotor rotate with it. If the pressure at 23 were increased to such an extent that all of the sealing fluid 22 were transferred into the rotor, then there would be leakage from 23 to 24. However, this cannot occur unless the pressure at 23 were exceeded so as to overcome the centrifugal force provided by a given operating speed.

When the thread seals 32,33 discharge to the right as shown, they minimize the possible entry of dust or dirt particles at 24. When they discharge to the left, they function to return any sealing fluid particles that may be present. The dynamic sealing of a pressure difference along the rotating shaft is mainly effected by the shaft speed, the shape and size of the rotor, and the sealing fluid selected. When there is no shaft rotation a pressure difference cannot be maintained, thus requiring the use of additional static seal elements.

The structure of FIGS. 1 and 2 may also be used as a containment seal. In this type of usage, there is no separate sealing fluid 22 used, but instead, the structure is part of an apparatus where there is a liquid present at 23, with no pressure drop across the seal 10. With such an arrangement any tendency of a fluid, such as a lubricant, to leak out, to the right at 23, is prevented by the seal 10. Even though no complete trap of sealing fluid would need to be present, the fluid to be contained would ultimately enter the rotor 16 at the annular gap 28 and be returned to the drain openings 29. Conceivably there could be recycling with the fluid going from the point 30 around to the annular gap 28, but it would be returned to the opening 29 and discharged at 30.

FIGS. 3-9 show various modifications of centrifugal fluid seal structure operating on similar principles. These embodiments are illustrated in use as a containment seal, and thus it is not necessary for their respective drain openings to be covered by the sealing fluid that surrounds the periphery of the rotor.

Figures 3, 4, 5:
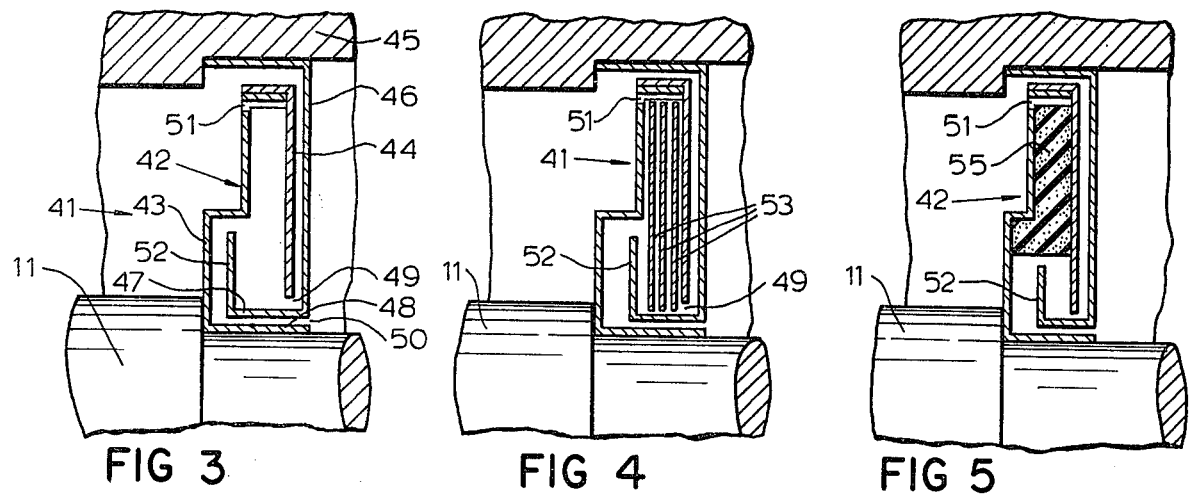
FIGS. 3-9 are radial cross-sectional views of modified forms of centrifugal fluid seals.

In FIG. 3, a centrifugal fluid seal 41 includes a hollow rotor 42 comprising an annular cup 43 closed at its periphery by an annular cover 44. A housing 45 has an annular cap 46 which has a cylindrical portion 47 that extends into the interior of the rotor 42, the rotor 42 having a cylindrical portion 48. The radially inner periphery of the cover 44 of the rotor and the radially outer periphery of the cylindrical portion 47 of the housing jointly define a first gap 49, while the radially innermost surface of the cylindrical portion 47 and the radially outermost surface of the cylindrical portion 48 jointly define a second gap 50. The rotor 42 has a series of drain holes 51. The cylindrical portion 47 of the housing, that extends into the interior of the rotor, carries an annular flange 52 remotely from the gap 49, the flange 52 being a diverting means on the housing, within the rotor, downstream of the gap, for diverting fluid from the gap 47 to the drain holes 51. In this embodiment, no conducting means is employed. Any fluid that is being sealed that may crawl along from the gap 49 to the flange 52 will be moved radially outwardly by centrifugal force for return through the drain holes 51.

The embodiment of FIG. 4 is the same as that of FIG. 3, except that conducting means in the form of three axially spaced annular laminations 53 have been added to the rotor cavity. These correspond to the laminations 38 of FIG. 1 in that they are disposed between the gap 49 and the flange-type of diverting means 52.

The centrifugal seal of FIG. 5, except for minor variations in proportions, made to provide an axially shorter seal assembly, includes a conducting means in the rotor in the form of a unified porous material 55 which will not give off any particles of itself to contaminate the fluid being sealed or contained. Examples of the unified porous material include rigid plastic foam, urethane sponge, felt, a wire mesh or screen, or a porous metal. As conducting means they are analogous to the laminations in that they provide increased surface areas within the rotor on which fluid can engage to thereby receive centrifuge force to supplement that which the rotor can provide by itself. In each of the embodiments of FIGS. 3, 4, 5 and 9, the flange-type of diverting means at no time extends radially outwardly sufficient to reach into any liquid that may be within the rotor, and which is attempting to exit through the drain holes 51. Thus, the scrubbing action on liquid that takes place between the rotor and the housing occurs only on the outside of the rotor, and never on the inside thereof.

Figures 8, 9:
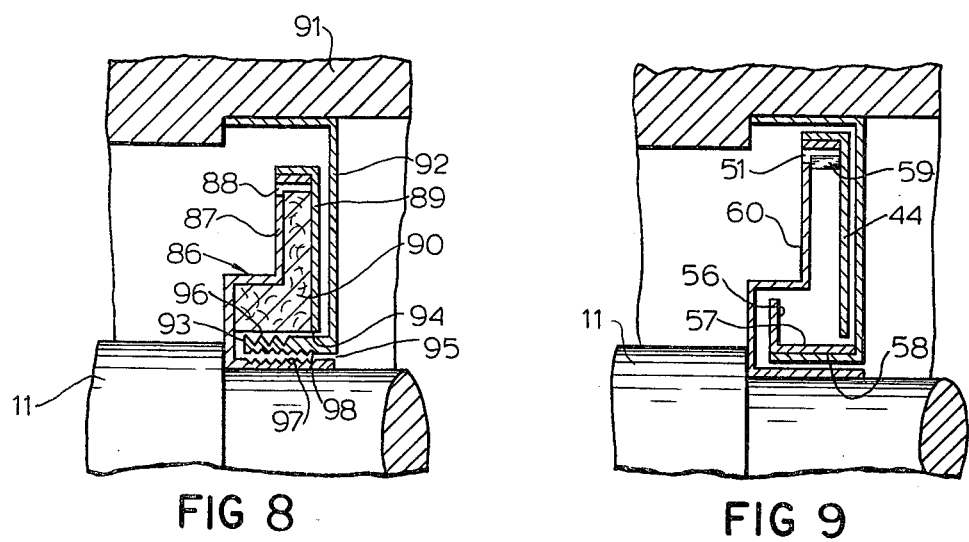

In the structures of FIGS. 3, 4 and 5, the housing cap 46 must be assembled at the same time that the rotor cup and cover are put together, and then the assembly of those components is installed on the shaft as a unit. FIG. 9 is very similar in construction except that the annular flange-type of diverting means 56 is carried on a separate cylindrical sleeve 57 which has a press fit with a cylindrical portion 58 of the housing cap. This arrangement can be assembled and disassembled independently by forcing the cylindrical portion 58 of the housing cap on and off the cylindrical sleeve 57, the latter having been previously disposed inside the cavity of the rotor. This species also has a number of vanes 59 struck out of and radially inward from the outer periphery of the annular cup 60, the openings thus formed being closed by the outer periphery of the annular cover 44 of the rotor. The vanes 59 minimize slippage of fluid within the rotor, thus tending to assure co-rotation of such fluid and the rotor.

As containment seals, these embodiments have as a primary purpose the prevention of escape of liquid or gases from a contained space where there is no significant pressure difference at the opposite sides of the seal along the shaft. In order to minimize the power loss in usage of the seal, the drain holes 51 are located at or close to the outer periphery of the rotor, and are preferably provided at the location illustrated or else directed radially outwardly. Such a construction minimizes wetting of the housing and rotor walls, and with enough fluid present to close the periphery between the rotor and the housing, this construction will even seal minor pressure differences between the cavities with a minimum frictional power loss during operation.

Figures 6, 7:
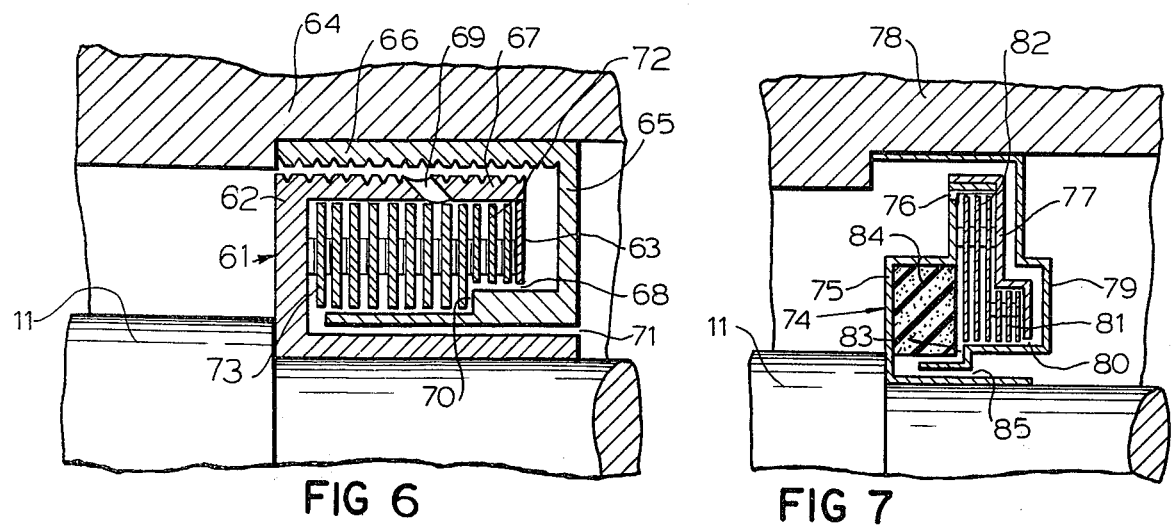

The embodiments of FIGS. 6, 7 and 8 enable the rotor to be installed first, and thereafter the housing cap is separately applied.

As shown in FIG. 6, a rotor 61 includes an annular cup 62 which is closed by an annular cover 63. The housing 64 includes a stationary annular cap 65 secured thereto. Fluid to be contained passes between a stationary housing wall 66 and a rotating rotor wall 67, and these surfaces are equipped with a screw thread seal which is threaded in an appropriate hand, depending upon direction of shaft rotation, to minimize fluid flow therebetween. The annular rotor cover 63 along with a portion of the housing cap 65 jointly define a first annular gap 68 leading to a hollow space within the rotor 61. Remotely from such annular gap 68, the rotor 61 has a number of drain openings 69 that discharge from the interior of the rotor to the space between the rotor and the housing where the fluid is entering the seal assembly. A diverting means in the form of an annular step 70 minimizes creepage of liquid along the inner cylindrical portion of the housing cap 65, such diverting means 70 thus being on the housing, within the rotor, and downstream of the gap 68, the housing cap 65 and the rotor cup 62 jointly defining a second gap 71 therebetween. Conducting means in the form of two sets of axially spaced annular laminations 72,73 are disposed and arranged and function as described in behalf of the laminations 38 and 39 of FIG. 2. In this embodiment, the drain holes 69 are not only in the periphery of the rotor, but are slanted to enable discharged liquid to tend to oppose liquid that is entering, thus aiding the function of the screw thread seal.

The seal of FIG. 7 embodies a combination of the features discussed above. To that end, a rotor 74 is composed of an annular cup 75 having a number of drain holes 76 at one side and closed at the opposite side by an annular cover 77. The housing 78 has and supports a housing cap 79 which with the rotor cover 77 defines a first annular gap 80 leading to the interior of the rotor 74, providing a liquid path to the drain holes 76, there being conducting means in the form of two sets of axially spaced annular laminations 81,82 disposed therebetween. Laminations 81 extend from the radius of the first annular gap 80 and are suitably transversely apertured near their outer peripheries to enable any liquid to follow the inside of the rotor cover 77 to the drain holes 76. This embodiment includes a diverting means in the form of an annular step 83 on the housing 79, within the rotor 74, downstream of the gap 80. Downstream of the annular step 83 there is disposed a further conducting means 84 in the form of a unified porous material as described above. Again, a second annular gap 85 is defined by cylindrical portions on the housing cap and the rotor cup.

As shown in FIG. 8, a further seal assembly includes a rotor assembly 86 including an annular cup 87 having drain holes 88, the rotor having an annular cover 89. Within the hollow rotor 86 there is disposed a unified porous material 90 as described above. The housing 91 has an annular cap 92 which defines part of the cavity in which the rotor 86 rotates the housing cap 92 having a cylindrical portion 93 which extends into the interior of the rotor and which with the rotor cover 89 defines a first annular gap 94, and with the annular cup of the rotor defines a second annular gap 95. A diverting means is provided on the cylindrical portion 93 of the housing cap which is disposed within the rotor, downstream of the gap 94, the same being in the form of annular grooves 96 having sharp crests. These crests reach close to but do not touch the unified porous material 90, and do divert the fluid from the gap 94 to the drain holes 88 via the porous conducting material 90. Further, a screw thread seal 97,98 is provided on the confronting faces that define the second annular gap 95.

If the housings of FIGS. 3–9 were modified to the left of the seals to include what amounts to a sealing fluid trap of U-shaped cross-section as shown in FIG. 1, then the various embodiments of FIGS. 3–9 could also be employed for pressure sealing purposes. The housing of FIG. 1 thus insures that the drain holes always discharge into sealing fluid, and the drain holes 51, 69, 76 and 88 of FIGS. 3–9 would be similarly protected by an annular layer of sealing fluid.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A centrifugal fluid seal for a shaft mounted for relative rotation with respect to a housing, said seal comprising:
   (a) a hollow rotor having an axial opening receptive of the shaft in fluid-tight relation, said rotor having a number of drain holes extending therethrough near the largest diameter of its hollow interior;
   (b) a housing having means defining a cavity surrounding said rotor in spaced relation to said rotor and the shaft, thereby defining a space, receptive of a sealing fluid or fluid leakage, between said housing and the radially outer portion of said rotor into which space said drain holes open;
   (c) said housing and said rotor jointly defining an annular gap leading from said space to the interior of said rotor radially inwardly of said drain holes; and
   (d) means carried by said housing and disposed within the interior of said rotor downstream of said annular gap for diverting fluid from said annular gap toward said drain holes, said diverting means being spaced radially inwardly from any liquid collecting upstream of said drain holes.

2. A centrifugal fluid seal according to claim 1, said rotor comprising an annular cup adapted to provide said fluid-tight relation with the shaft, and an annular cover recurved to the periphery of said annular cup and defining the radially outer surface of said annular gap.

3. A centrifugal fluid seal according to claim 2, said housing including a cap defining a portion of said cavity, said annular cup and said annular cap jointly defining a second annular gap communicating the outside of said annular cap with the interior of said rotor.

4. A centrifugal fluid seal according to claim 3, said diverting means including an annular step within said rotor and having a diameter intermediate those of said annular gaps.

5. A centrifugal fluid seal according to claim 3, said annular cup and said annular cap each having a cylindrical portion jointly defining said second annular gap.

6. A centrifugal fluid seal according to claim 5, at least one of said cylindrical portions having a screw-thread seal confronting said second annular gap.

7. A centrifugal fluid seal according to claim 1, said housing including an annular cap defining a portion of said cavity.

8. A centrifugal fluid seal according to claim 1, said housing having a fluid port communicating with said cavity.

9. A centrifugal fluid seal according to claim 1, including a plurality of axially spaced annular laminations within said rotor and radially positioned by engagement of their outer peripheries with the interior of said rotor, their inner peripheries having a diameter similar to that of said annular gap.

10. A centrifugal fluid seal according to claim 1, said diverting means including an annular step within said rotor and having a diameter smaller than that of said annular gap.

11. A centrifugal fluid seal according to claim 10, including conducting means within said rotor extending from said step to said drain holes through which fluid may pass in response to centrifugal force.

12. A centrifugal fluid seal according to claim 11, said conducting means being a plurality of axially spaced laminations.

13. A centrifugal fluid seal according to claim 1, including conducting means supported within said rotor and providing surfaces on which fluid may pass, in response to centrifugal force from said annular gap to said drain holes.

14. A centrifugal fluid seal according to claim 13, said conducting means including axially spaced laminations.

15. A centrifugal fluid seal according to claim 13, said conducting means including unified porous material.

16. A centrifugal fluid seal according to claim 1, said diverting means including annular grooves in said housing downstream of said annular gap.

17. A centrifugal fluid seal according to claim 1, said diverting means comprising an annular flange on said housing within said rotor.

18. A centrifugal fluid seal according to claim 1, said housing having a cylindrical portion extending into said rotor, a cylindrical sleeve having a press fit with said cylindrical portion and disposed within said rotor, and said diverting means comprising an annular flange on said cylindrical sleeve remote from said annular gap.

* * * * *